Patented Nov. 30, 1937

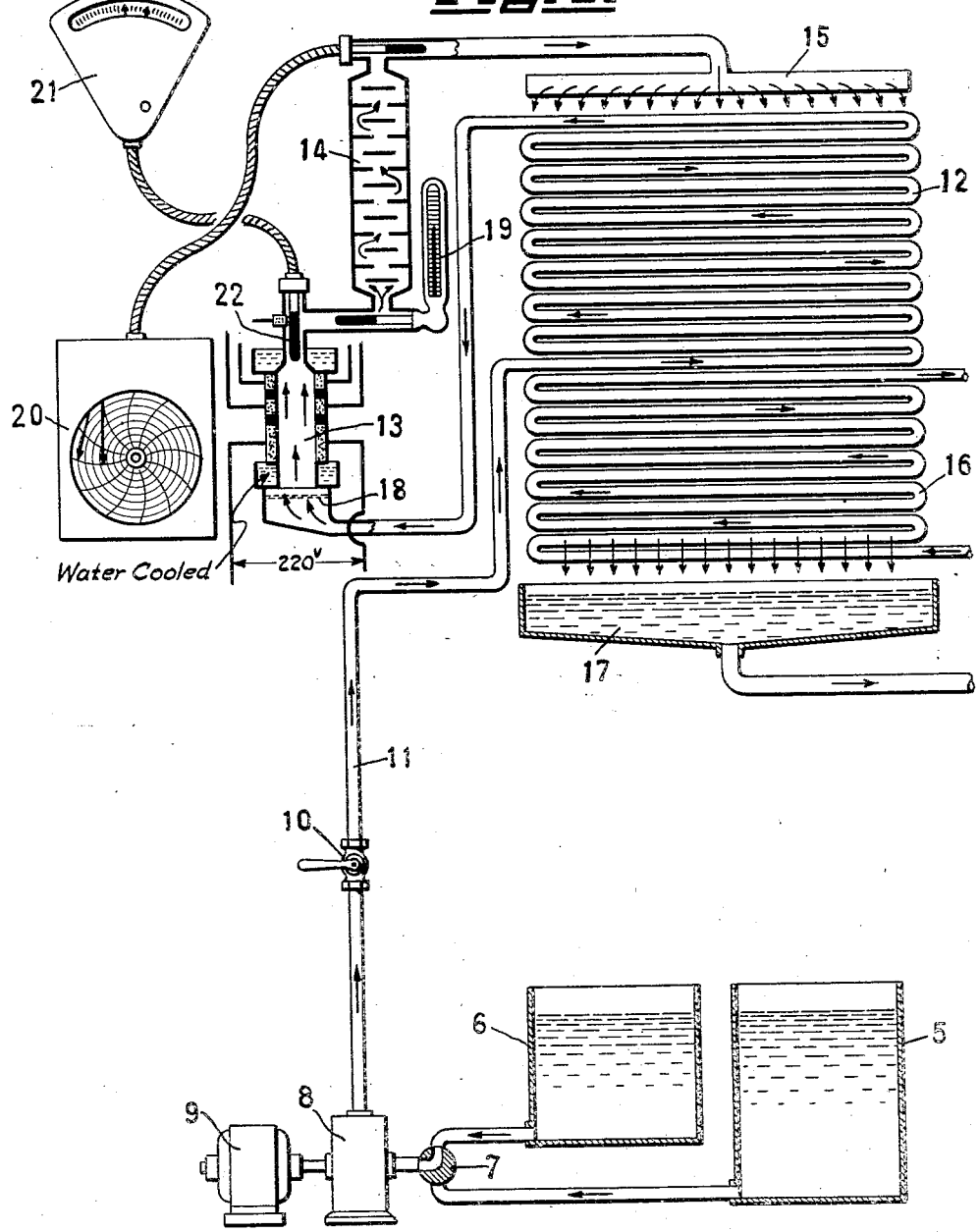

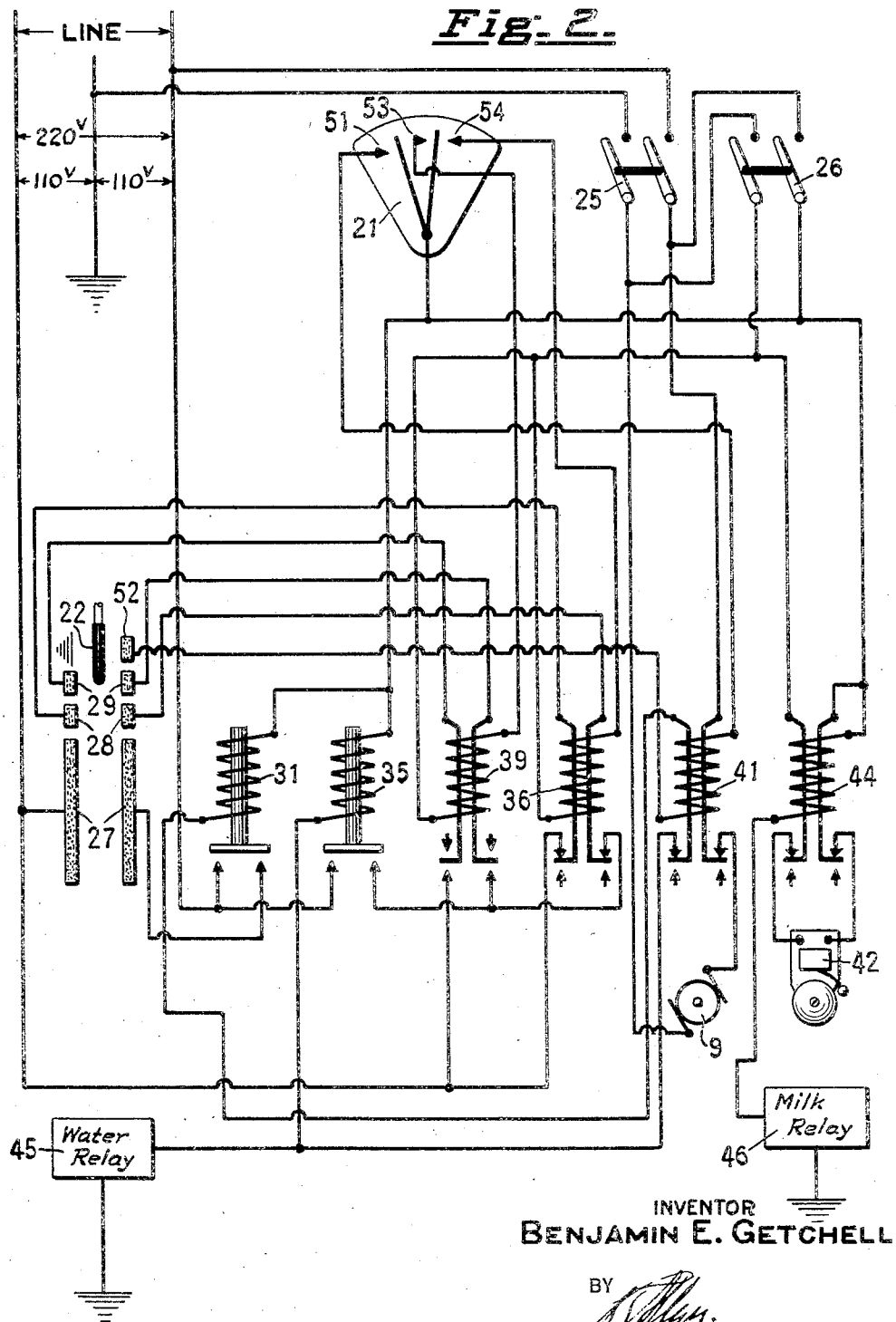

2,100,329

UNITED STATES PATENT OFFICE 2,100,329

PASTEURIZING SYSTEM, ETC.

Benjamin E. Getchell, Plainville, Conn., assignor to The Trumbull Electric Manufacturing Company, Plainville, Conn., a corporation of Connecticut Application June 6, 1936, Serial No. 83,839

11 Claims. (Cl. 219—40)

My invention relates particularly to a system for the heating and cooling of milk although certain features of the invention are applicable to the similar treatment of other liquids by electric current.

One object is to provide comparatively simple apparatus by means of which the liquid may be quickly heated to a high temperature and by which the temperature can be accurately and automatically controlled within narrow limits.

Another object is to provide a system which will satisfactorily treat liquids of varying initial temperatures and discharge the liquid at a predetermined controlled temperature.

Another object is to provide a system in which the rate of flow of milk may be controlled and synchronized with a bottling machine and in which variations in the temperature of the liquid to be treated, variations in its electrical conductivity, variations in room temperature, and/or variations in the line voltage may be compensated for automatically.

In carrying out the invention I employ a liquid circulating system including a motor driven pump, a regenerative coil or heat exchanger, a heating chamber having a number of pairs of electrodes, together with thermostatically controlled relays governed by the temperature of the treated liquid and by means of which the number of pairs of electrodes in circuit may be increased or diminished.

When the temperature falls below a predetermined point an additional pair of electrodes is automatically cut into the circuit and when the temperature rises above a predetermined maximum a pair of electrodes is automatically cut out of the circuit. When the temperature falls below another predetermined low point the motor is stopped and the liquid flows back through the heating chamber. When the level of the liquid in the heating chamber falls below a predetermined point, or when the heat of the backward flowing liquid is above the low temperature minimum, the motor is again started. This starting and stopping is repeated until the temperature of the treated liquid reaches the predetermined minimum pasteurizing point at which time normal continuous flow will be resumed.

The rate of flow of the liquid when the motor is operating is controlled by a manually operable valve in the circulating system below the preheater.

Fig. 1 is a diagrammatic view showing the circulating system and the device for controlling the electric relays.

Fig. 2 is a diagrammatic view showing the electrical circuits and with parts of the switches shown in positions which they occupy at times.

The raw or untreated liquid is supplied from one or more tanks 5 and the saline solution for starting may be supplied from the tank 6. The valve 7 determines from which tank the liquid shall be drawn.

The circulating pump 8 is preferably of a type which permits liquid to flow backward through it when the pump stops. The pump is preferably driven by a constant speed electric motor 9. A valve 10 for manually adjusting the rate of flow is located in the circulating pipe 11 preferably below the regenerative coils or preheater 12. The heating chamber 13 receives the liquid after it has passed through the preheater and heats it to the pasteurizing point. A holding chamber 14 serves to hold the heated liquid for a predetermined length of time so that complete pasturization takes place. The heated liquid is sprayed from a spreader or spray head 15 onto the outside of the preheater coil over which it flows, and is cooled by transferring its heat to the incoming cold milk. Below the preheater is arranged a refrigerating coil 16 over which the milk continues to flow and is further cooled to bottling temperature. It then flows into the collecting pan 17 from which the liquid is led to the bottling machine (not shown).

A filter 18 may be employed at a suitable point in the circulating system. The electrodes of the heating chamber are preferably water cooled. The temperature of the heated liquid above the heating chamber is indicated by a thermometer 19 whose bulb is arranged in the circulating passage beneath the holding chamber 14. The temperature of the liquid as it leaves the holding chamber is recorded by a suitable instrument 20 whose bulb is in the circulating system above or below the holding chamber. A suitable switching device or temperature controlled contactor 21 has a sensitive element 22 in the milk stream close to the discharge end of the heating chamber.

One form of such temperature controlled contactor is shown in my application Serial Number 752,223 in which the movable switch contacts are actuated by pressure from a pipe and sensitive element or bulb 22 of any well known type.

Power may be supplied from an ordinary commercial 220 volt system having an entrance switch (not shown).

All of the magnetic contactors and relays described below are shown diagrammatically and the circuits are illustrated as if the movable elements move downward when their control circuits are energized and move upward when not energized.

General description of the electric circuits

A manually operated switch 25 controls the pump. It also energizes the line side of switch 26.

The control switch 26 is dependent upon switch 25 for its supply of energy. This switch furnishes the power to all of the control circuits and also to the alarm circuit.

Temperature control contactor 21 is operated by means of bulb 22 in the milk flow, just above the heating chamber, and is responsive to variations in temperature of the milk. In this contactor are three contacts 51, 53, and 54, one to actuate the circuit guarding against milk flow below 160 degrees, one to correct temperature if it drops ½ degree or more below the pasteurizing point, and one to correct temperature if it rises ½ degree or more above pasteurizing point, respectively.

The lower section of the heating chamber is marked 27. The power input to this section of the chamber is supplied directly across the line through contactor 31.

The lower of the two upper sections of the heating chamber 28 is supplied with 220 volt power by contactor 35 and relay 39.

The upper of the two upper sections of the heating chamber 29 is supplied with 220 volt power by contactor 35 and relay 36.

The electrodes 27, which carry out most of the normal heating, are preferably made of considerably greater area than the other electrodes.

A water relay 45 is in the control circuit of the contactors 31 and 35 furnishing power to the heating chamber. Failure of cooling water flow over the electrodes of the heating chamber will cause this relay to interrupt the supply of power to the heating chamber.

Milk relay 46 is in the control circuit of the alarm relay 44. If the milk in the raw milk tank drops below a predetermined level, it will open the control circuit of this relay, allowing the alarm circuit to go on and notify the operator.

Pump motor 9 is under manual control of switch 25 and under automatic control of relay 41.

The low milk alarm 42 is under control of relays 46 and 44.

I provide an auxiliary electrode 52 in the pump stop circuit. It is in the circuit of relay 41 and if milk is flowing by this electrode when 21 engages the 160 degree contact 51, a circuit is completed through relay 41 which opens the pump motor circuit. If there is no conducting fluid such as milk or saline solution beyond the top of the heating chamber at 52 the circuit through relay 41 will not be completed and the pump will not stop.

A magnetic contactor 31 furnishes 220 volt power to section 27 of the heating chamber. It is under automatic control of relay 45 and relay 41.

A magnetic contactor 35 supplies 220 volt power to the two upper sections, 28 and 29, of the heating chamber, through relays 39 and 36. It is under the automatic control of relay 45.

Relay 41 is under the control of the 160 degree contact 51 of contactor 21, and also under the control of auxiliary electrode 52. Relay 41 controls the pump, and the magnetic circuit of contactor 31. When this relay is energized by temperature controller 21 it will open the pump motor circuit and also the magnetic circuit of 31.

Relay 39 governs the circuit of sectional electrode chamber 29. This relay is under control of contact 53 of temperature controller 21.

Relay 36 controls the supply of power to section 28 of the heating chamber. This relay is under the control of contact 54 of temperature controller 21.

Relay 44 in the low milk alarm circuit is under control of relay 46 and governs the alarm 42. It automatically notifies the operator in case the milk supply drops below a predetermined point.

Pump motor circuit

Upon closing switch 25 a circuit is established through the right hand contact of relay 41 to the pump motor 9. Thus the pump is under manual control of switch 25 and under automatic control of relay 41.

Low milk alarm

The control circuit of relay 44 is normally energized from low milk relay 46 which holds the circuit of alarm 42 in the open position. In case the milk drops below a predetermined level in the raw milk tank, relay 46 interrupts the magnetic circuit of relay 44. This permits the contacts of relay 44 to close, establishing the alarm circuit.

The purpose of this alarm is to notify the operator that the raw milk supply is nearly exhausted so that he may either renew the same or prepare to shut down the plant as the case may be.

Normal operating circuits

Closing switch 25 closes a circuit, previously described, through the pump motor. Closing switch 26 energizes the control circuits. The magnet of contactor 31 is energized from switch 26 through the left hand leg of relay 41 and through relay 45. This closes the contacts of 31 and supplies 220 volt power to section 27 of the heating chamber.

The magnet of contactor 35 is energized from switch 26 through relay 45. This closes the contacts of 35 and supplies 220 volt power to relays 39 and 36.

The magnet of relay 39 is not energized, therefore it does not transmit this 220 volt power to section 29 of the heating chamber. The magnet of relay 36 is not energized and its contacts do supply 220 volt power to section 28 of the heating chamber.

Relay 39 is so connected that its contacts will close only when its magnet is energized. Relay 36 is so connected that its contacts are closed only when its magnet is de-energized.

Thus, sections 27 and 28 of the heating chamber are normally energized and 29 stands on guard ready to go into circuit if the temperature drops below pasteurizing temperature. The magnet of relay 44 is energized which holds the alarm circuit open.

Operation for correcting normal low temperature

In case heating temperature drops ½ degree or more below the pasteurizing point, contactor 21 energizes the magnet of the relay 39 through contact 53 causing relay 39 to close and supply 220 volt power to section 29 of the heating chamber. This increases the length of the energized chamber and increases the temperature of the milk passing through.

As soon as the milk reaches within ½ degree of the pasteurizing temperature, controller 21 will open the magnetic circuit of relay 39 at contact 53 and normal operation will be resumed.

Operation for correcting high temperature

In case the temperature rises ½ degree or more above the pasteurizing point, contactor 21 energizes the magnet of relay 36 through contact 54. This causes the contacts of 36 to break the normally closed 220 volt circuit to section 28 of the heating chamber. This reduces the length of the energized portion of the heating chamber and reduces the temperature of the milk flowing through.

As soon as this temperature reaches within ½ degree of the pasteurizing point contactor 21 breaks the magnetic circuit at contact 54 and normal operation is resumed.

Operation for correcting abnormal low temperature

In case the pasteurizing temperature drops to 160 degrees or less, contactor 21 energizes the magnet of relay 39 through contact 53 which supplies 220 volts to section 29 of the heating chamber.

Contactor 21 also energizes relay 41 through contact 51 which opens the pump circuit, thus stopping forward flow of milk. Relay 41 also opens the magnetic circuit of contactor 31 which interrupts the supply of power to section 27 of the heating chamber. Thus the power input to the heating chamber is reduced, only sections 28 and 29 being energized so as to prevent the milk from being overheated during backward flow. As soon as all of the cold milk is returned to the heating chamber the magnetic circuit of relay 41 will be broken, either at auxiliary electrode 52 or by contactor 21 at contact 51 and the pump will start and force the milk up as far as electrode 52 and temperature bulb of contactor 21.

If the temperature is above 160 degrees contactor 21 will interrupt the magnetic circuit of relay 41 at 51 and allow the pump to continue in operation, if not, relay 41 will again interrupt the pump circuit and the milk will again return to the heating chamber for retreatment.

As soon as the temperature reaches the required point, normal operation will be resumed.

Failure of electrode cooling water

It will be noted that relay 45 controls the magnet circuits of contactors 31 and 35.

Failure of water flow over the electrodes causes this relay 45 to break these magnet circuits. This causes 31 and 35 to open and interrupt the power supply to the entire heating chamber, 27, 28 and 29. The treating temperature of the milk will immediately drop causing relay 41 to become energized and interrupt the pump motor circuit.

The milk will return to the heating chamber and the pump will alternately start and stop, as previously described under abnormal low temperature, taking tests on the milk temperature as before, but no milk will be permitted to pass, as the temperature cannot come up to the pasteurizing point while the power is off, and this testing will go on indefinitely until the water flow over the electrodes is re-established.

The power circuits will then go on, and operation will be resumed as described under abnormal low temperature, and as soon as the treating temperature reaches the proper point normal operation will again be resumed.

Low milk alarm

In case the raw milk supply drops below a predetermined point, relay 46 acts to open the magnetic circuit of relay 44.

This establishes a circuit through the alarm 42 which notifies the operator that his raw milk supply will soon become exhausted so that he may either renew same or prepare to shut down the plant.

The preferred method of starting the system necessitates that saline solution be supplied to tank 6 and raw milk (the liquid to be treated) to tank 5. Cooling water must be supplied to the electrodes. The main disconnect switch is then closed, energizing the power line. Contactor 21 should be set for a temperature above a predetermined point (say 170°) which setting will automatically keep contact 51 open. Otherwise this contact would normally cause the pump to stop as soon as the first flow of cold liquid passed control bulb 22 and electrode 52. Valve 7 is set so, that saline solution from tank 6 is supplied to the system. Now switch 25 is closed, supplying current through the contact of relay 41 to the pump motor. This causes the pump to start and circulate saline solution from tank 6 through the system.

Now switch 26 is closed and the control circuits will be energized. Circuit will be established through the coil of relay 44 and milk switch 46 which will hold the alarm circuit open.

Another circuit is established through the magnets of contactors 31 and 35 and cooling water relay 45, thus causing the contacts of magnetic contactors 31 and 35 to close and establish the normal heating circuit to the electrodes 27 and 28. The circuit to electrodes 27 is supplied directly from contactor contacts of 31. The circuit to electrodes 28 is supplied through magnetic contactor 35 and relay 36.

Power is also supplied to electrodes 29 through the contacts of magnetic contactor 35 and relay 39, relay 39 being energized to close due to low temperature causing 21 to contact at 53. Thus during the preliminary heating the full electrode chamber is energized to speed up this operation.

As the fluid becomes heated in 13 it gradually produces a heat exchange in heat exchange coils 12 which builds up the temperature of the fluid entering the heating chamber. This in turn causes it to leave at a higher temperature and increases heat exchange at 12. This cycle of build-up of heat will bring the pasteurizing temperature up to the point set at 21. Contactor 21 may now be set down to normal pasteurizing temperature and the 3-way valve 7 thrown into position to draw raw milk from tank 5. This milk follows the water through the system, driving it out and establishes complete milk flow. The plant now automatically operates until the raw milk is all pasteurized, and the operator will be notified in due time before the milk is completely out of the raw milk tank.

Another less preferable but feasible method of starting the plant is to set the contactor 21 at the desired pasteurizing temperature and valve 7 to feed raw milk directly into the system. When the first of this milk reaches the top of the electrode chamber and at control bulb 22 and electrode 52, it will not be up to pasteurizing temperature as heat exchange has not been established. Therefore the pump will stop as previously described and the milk will be held in the heating chamber until the milk is up to or above the pasteurizing point. It will then be permitted to pass through as described under abnormal low temperature and a series of starting, stopping, and forward flow operations will ensue until normal heat exchange has been established, at which time normal operation will take place.

The circulating system is so designed that a large part of the rise in temperature of the milk is preferably effected in the preheater. To avoid overheating on backward flow it is desirable to have part of the electric current flow stopped at this time.

By providing a series of pairs of electrodes in the heating chamber it is possible to vary the length of time during which the liquid is subjected to the electrical treatment without varying the rate of flow of the liquid.

I claim:

1. In a pasteurizing system, a heating chamber having three pairs of electrodes, two of which are normally in circuit, means for forcing liquid through said chamber, means controlled by the increase in temperature of the liquid as it leaves the chamber for automatically cutting out one pair when the temperature of the treated liquid increases to a predetermined degree, means controlled by the decrease in temperature of the liquid as it leaves the chamber for automatically applying current to the third pair of electrodes when the temperature decreases a predetermined amount, and means for automatically controlling the rate of flow of liquid through the heating chamber.

2. In a pasteurizing system, a heating chamber having three pairs of electrodes, two of which are normally in circuit, means for cutting out one pair when the temperature of the treated liquid increases to a predetermined degree, means for applying current to the third pair of electrodes when the temperature decreases a predetermined amount, means for cutting out one pair of electrodes when the temperature falls below a predetermined point, and means for controlling the rate of flow of liquid through the heating chamber.

3. In a pasteurizing system, a heating chamber having three pairs of electrodes, two of which are normally in circuit, means for cutting out one pair when the temperature of the treated liquid increases to a predetermined degree, means for applying current to the third pair of electrodes when the temperature decreases a predetermined amount, means for forcing liquid through the heating chamber and means for stopping the forward flow of liquid and decreasing the heating effect when the temperature falls below a predetermined point.

4. In a pasteurizing system, a circulating system having an electric heating chamber and a pump for forcing liquid through said chamber, thermostatically controlled means for increasing the time to which the liquid is subjected to current without changing the rate of flow when the temperature falls a predetermined amount, and means for stopping the pump and decreasing the heating effect when the temperature falls a predetermined greater amount.

5. The method of regulating the temperature of liquid flowing through a heating chamber which includes the steps of first increasing the effective heating surface when the temperature falls a certain predetermined amount and then decreasing the effective heating surface as the temperature falls still lower and at the same time reversing the flow of liquid so as to reheat the liquid.

6. The method of regulating the temperature of liquid passing from the heating chamber of an electric pasteurizing system which includes decreasing the effective length of the chamber when the temperature of the liquid rises a predetermined amount, increasing the effective length of the heating chamber when the temperature falls a predetermined amount, decreasing the effective length when the temperature falls a greater amount and at the same time causing liquid to return to the heating chamber to be reheated.

7. The method of regulating the temperature of liquid passing from a heating chamber having a plurality of pairs of electrodes which includes de-energizing one pair of electrodes when the temperature of the liquid rises above a predetermined degree, energizing an additional pair of electrodes when the temperature falls below a lower predetermined degree, and causing the liquid to be returned to the heating chamber for reheating in case the temperature falls below a predetermined still lower degree.

8. In a pasteurizing system, a heating chamber having a plurality of electrodes, means for causing liquid to flow between the electrodes, means for applying alternating current to the electrodes, means for increasing the time during which the liquid is subjected to the current when the temperature falls a certain amount and means for decreasing the time of treatment when the temperature falls a greater amount.

9. In a pasteurizing system, a heating chamber having electrodes, means for causing liquid to flow through said chamber, means for increasing the effective electrode surface when the temperature falls a predetermined amount, means for decreasing the effective electrode surface when the temperature falls still further and returning the liquid to the heating chamber and means for causing the liquid to leave the heating chamber when a predetermined temperature has been reached.

10. Apparatus for pasteurizing liquid which includes, a heating chamber having three pairs of electrodes, one pair being of considerably greater area than either of the others, means for causing liquid to flow through the chamber in one direction and means for applying alternating current to the largest pair and to one of the smaller pairs for heating the liquid to a desired temperature, means for applying alternating current to the third pair of electrodes when the temperature of the heated liquid fails to reach the desired temperature and means for deenergizing one of the normally energized pairs of electrodes when the liquid gets too hot and means for reheating the liquid when it fails to reach a predetermined temperature.

11. In a liquid heating system, a heating chamber having electrodes, a motor driven pump for forcing liquid through the chamber at a substantially constant rate and capable of permitting the liquid to flow back through the chamber when the pump stops, means for passing an alternating current through the liquid as it flows through said chamber, means for reducing the effective length of the heating chamber when the temperature rises above a predetermined degree, means for stopping the pump when the temperature falls below a certain degree and causing the liquid to return to the heating chamber and means for restarting the motor when the liquid returns to a predetermined point in the chamber.

BENJAMIN E. GETCHELL.